US012804320B2

(12) United States Patent
Ito

(10) Patent No.: US 12,804,320 B2
(45) Date of Patent: Nov. 17, 2026

(54) ACOUSTIC APPARATUS

(71) Applicant: ALPS ALPINE CO., LTD., Tokyo (JP)

(72) Inventor: Ryo Ito, Fukushima (JP)

(73) Assignee: ALPS ALPINE CO., LTD., Tokyo (JP)

( * ) Notice: Subject to any disclaimer, the term of this patent is extended or adjusted under 35 U.S.C. 154(b) by 166 days.

(21) Appl. No.: 18/769,792

(22) Filed: Jul. 11, 2024

(65) Prior Publication Data

US 2025/0039603 A1 Jan. 30, 2025

(30) Foreign Application Priority Data

Jul. 26, 2023 (JP) ................................ 2023-121815

(51) Int. Cl.

*H04R 3/04* (2006.01)
*H04R 7/16* (2006.01)

(52) U.S. Cl.

CPC ................ *H04R 3/04* (2013.01); *H04R 7/16* (2013.01); *H04R 2499/13* (2013.01)

(58) Field of Classification Search

CPC .......... H04R 1/345; H04R 5/02; H04R 1/403; H04R 1/028; H04R 2499/13; H04R 1/025; H04R 5/023; H04R 1/2819; H04R 1/2842; H04R 1/26; H04R 3/12; H04R 1/2857; H04S 7/302

See application file for complete search history.

(56) References Cited

U.S. PATENT DOCUMENTS

2005/0117767 A1* 6/2005 Ito ........................ H04R 1/2849 381/301
2007/0058824 A1* 3/2007 Aylward ................ H04R 1/345 381/152
2007/0121974 A1* 5/2007 Nemirovski ......... H04R 1/1016 381/312
2017/0088266 A1* 3/2017 Tracy ............... B64D 11/00154
2021/0377637 A1 12/2021 Ziemba
2022/0182765 A1 6/2022 Tabata
2022/0225017 A1* 7/2022 Tabata ................. H04R 1/2888

FOREIGN PATENT DOCUMENTS

JP 2007-082220 3/2007

OTHER PUBLICATIONS

Extended European Search Report for EP24188771.0 mailed on Dec. 9, 2024.

* cited by examiner

*Primary Examiner* — Carolyn R Edwards
*Assistant Examiner* — Julie X Dang
(74) *Attorney, Agent, or Firm* — IPUSA, PLLC

(57) ABSTRACT

An acoustic apparatus includes an enclosure, a duct communicating into an inner space of the enclosure, and a speaker unit configured to transmit sound pressures in opposite phases to an inside and an outside of the enclosure, respectively, wherein at least the enclosure and the speaker unit are fixed to a seat, wherein a resonant frequency Fd of a Helmholtz resonator composed of the enclosure and the duct is higher than a resonant frequency F0 of a vibration mass including a mass of a vibrating part of the speaker and a load mass of air in the duct, and wherein a listening position is situated at a position where a direct distance Ld from an exit of the duct is shorter than a direct distance Ls from a diaphragm of the speaker unit.

5 Claims, 6 Drawing Sheets

ACOUSTIC APPARATUS

BACKGROUND OF THE INVENTION

1. Field of the Invention

The disclosures herein relate to an acoustic apparatus that can transmit a sound pressure in which a bass range is enhanced to a listener seated in a seat disposed in an interior of a vehicle and the like.

2. Description of the Related Art

FIG. 3 of PTL 1 illustrates an acoustic apparatus mounted in a seat. The acoustic apparatus includes an acoustic enclosure having an upper acoustic chamber and a lower acoustic chamber. An electroacoustic transducer, which is a speaker unit, is disposed on a coupler of the upper acoustic chamber and the lower acoustic chamber. One radiating surface of the electroacoustic transducer is acoustically coupled to the upper acoustic chamber, and the other radiating surface is acoustically connected to the lower acoustic chamber. An upper chamber exit is opened near a head of a person seated in the seat. The lower chamber exit is opened downward towards a floor, and the lower chamber exit is significantly far from the head of the person.

Paragraph of PTL 1 discloses that a sound heard by the seated person is affected much more by radiation from the upper chamber exit than from the lower chamber exit, because the head of the seated person is significantly closer to the upper chamber exit than to the lower chamber exit. Moreover, paragraph discloses that pressure waves transmitted by the electroacoustic transducer to the upper acoustic chamber and the lower acoustic chamber have opposite phases, and paragraph and the like disclose that at locations such as location 50 that are relatively equidistant from the lower chamber exit and the upper chamber exit, an amplitude of acoustic energy from the two exits is lesser than near the head of the seated person, because of destructive interference due to phase differences.

PTL 1 discloses that the upper chamber is positioned near the head of the person, and the acoustic energy is transmitted from the exit to the head of the person; however, what kind of resonance operations are exhibited is not disclosed. A resonant frequency of a general Helmholtz resonator, having an enclosure and a duct, is inversely proportional to the length of the duct, and proportional to the cross section of the duct, however; since the length of the upper chamber disclosed in PTL 1 is approximately zero, it is easily estimated that the upper acoustic chamber cannot cause a resonance of a low frequency band.

The present embodiment resolves the related problem, and aims to provide an acoustic apparatus which enables a seated person in a vehicle and the like to listen to bass of a comparably wide frequency band with a sufficient sound pressure, and decrease bass range sound pressure at a place far from the seat.

CITATION LIST

Patent Literature

[PTL 1] Japanese Laid-Open Patent Publication No. 2007-82220

SUMMARY OF THE INVENTION

An acoustic apparatus includes an enclosure, a duct communicating into an inner space of the enclosure, and a speaker unit configured to transmit sound pressures in opposite phases to an inside and an outside of the enclosure, respectively, wherein at least the enclosure and the speaker unit are fixed to a seat, wherein a resonant frequency Fd of a Helmholtz resonator composed of the enclosure and the duct is higher than a resonant frequency F0 of a vibration mass including a mass of a vibrating part of the speaker and a load mass of air in the duct, and wherein a listening position is situated at a position at which a direct distance Ld from an exit of the duct is shorter than a direct distance Ls from a diaphragm of the speaker unit.

In the acoustic apparatus, the speaker unit and the enclosure are stored in a seat back or a seat cushion, wherein one of the sound pressures in opposite phase to another one of the sound pressures that is transmitted to the enclosure is transmitted from the speaker unit to a listener seated in the seat, and the exit of the duct is opened near an ear of the listener.

In the acoustic apparatus, the duct is a flexible hose which is stored in the seat back at least partially.

In the acoustic apparatus, the resonant frequency F0 of the vibration mass is less than 100 Hz.

In the acoustic apparatus, a sound pressure obtained at the exit of the duct has a peak situated in a frequency band lower than 100 Hz, and another peak situated in a frequency band higher than 100 Hz.

A resonant frequency Fd of a Helmholtz resonator composed of an enclosure and a duct communicating into an inner space of the enclosure is physically calculated from an internal volume (V) of the enclosure, and a length (L) and a cross section(S) of the duct $\{Fd=(C/2\cdot\pi)\sqrt{(S/V\cdot L)}$; C refers to a speed of sound$\}$. The resonant frequency Fd is inversely proportional to the internal volume (V) of the enclosure and the length of the duct (L), and is proportional to the cross section(S) of the duct. In the case of an operation of the Helmholtz resonator, when a frequency of a pressure wave entering the enclosure coincides with the resonant frequency Fd, air in the enclosure expands and contracts like a spring and air in the duct resonates with the opposite phase to the entering pressure wave. When the entering pressure wave becomes higher than the resonant frequency Fd, the air in the enclosure expands and contracts like a spring, but the air in the duct becomes less mobile. When the entering pressure wave becomes lower than the resonant frequency Fd, as the air in the enclosure expands and contracts, the air in the duct become more mobile within the duct with the same phase as the entering pressure wave.

An acoustic apparatus of the present embodiment uses a bass reflex system in which a speaker unit is disposed in the enclosure, and enables the vibration mass Mms including mass of a vibrating part of the speaker unit, and load mass of the air in the duct which moves with the same period as that of the vibration part, to resonate, in a frequency band lower than the resonant frequency Fd of the Helmholtz generator. That is, a resonant frequency F0, which is calculated from a spring coefficient of a spring supporting system Kms, in which an elastic modulus of damper material and an edge material of the speaker unit, and the air in the enclosure, are considered, and the vibration mass Mms, is lower than the resonant frequency Fd of the Helmholtz resonator. In the present disclosure, the resonant frequency F0 here is referred to as "the resonant frequency F0 of the vibration mass Mms of the speaker system with a bass reflex system". In the present embodiment, the resonant frequency F0 of the vibration mass Mms is adjusted to be lower than the resonant frequency Fd resonator, of the Helmholtz for example, by increasing the mass of the vibrating part of the speaker unit 20, by configuring the vibration mass Mms to be heavy by increasing the load mass of the air in the duct by decreasing the inside diameter of the duct 12, increasing the length of the duct, and the like, and by configuring the spring coefficient of the spring supporting system Kms of the speaker system 20 to be low.

The acoustic apparatus of the present embodiment, focusing on the sound pressure radiated from an exit of the duct, can raise the sound pressure level in a wide frequency band from near the resonant frequency F0 to near the resonant frequency Fd, and enables to operate as what is called a bandpass acoustic apparatus, by situating the resonant frequency Fd of the Helmholtz resonator higher than the resonant frequency F0 of the vibration mass Mms including the vibrating part of the speaker unit and the load mass of the air in the duct, in the bass reflex system.

In the acoustic apparatus of the present embodiment, at least the enclosure and the speaker unit are fixed to a seat, and a listening position is situated at a position where a direct distance Ld from the exit of the duct is shorter than a direct distance Ls from a diaphragm of the speaker unit. Therefore, the sound pressure is transmitted to ears of a seated person from the exit of the duct directly, and the seated person is enabled to listen preferentially to a sound whose bass range, a frequency band from near F0 to near Fd, is enhanced. However, when the speaker unit operates and generates the sound pressure in a wide frequency band from the resonant frequency near F0 to the resonant frequency near Fd, since the vibrating part of the speaker and the air in the duct move in the same phase, the sound pressure radiated from the duct to the outer space, and the sound pressure transmitted to the outer space of the enclosure (a space opposite the inner space of the enclosure) from a diaphragm of the speaker unit, become in opposite phases. Therefore, at locations far from the exit of the duct, since the sound pressures in opposite phases interfere to cancel each other, bass sound from the resonant frequency near F0 to the resonant frequency near Fd can be suppressed. For example, when the acoustic apparatus is mounted in a seat in an interior of a vehicle, the sound is audible to the ears of the seated person with the enhanced frequency band, but the bass sound from the resonant frequency near F0 to the resonant frequency near Fd does not readily to leak to a place in the interior of the vehicle far from the exit of the duct, or outside of the vehicle.

In order to listen to a bass range sound pressure with effect with human ears, it is desirable to enhance bass range sound pressure, conversely, the bass range sound pressure tends to propagate to surroundings, for it tends to propagate through an outside panel of a vehicle. The acoustic apparatus of the present embodiment can transmit a bass range enhanced in a comparably wide range to the ears of the listener, and conversely enables to reduce bass range sound pressure at places far from the acoustic apparatus.

DESCRIPTION OF THE PREFERRED EMBODIMENTS

In an acoustic apparatus of the present embodiment, at least an enclosure and a speaker unit are fixed to a seat, preferably, embedded inside the seat. The enclosure and the speaker unit are fixed inside the seat back as the embodiment 1 shown in FIG. 1, or fixed inside a seat cushion as the embodiment 2 shown in FIG. 3. Moreover, the enclosure and the speaker unit can be configured to be small and fixed in a headrest. The seat is disposed in an interior of an automobile, or in other kinds of transportation, for example inside a train. Moreover, the seat may be disposed in theaters or video game arcades, and may also be for household use.

Figure 1:
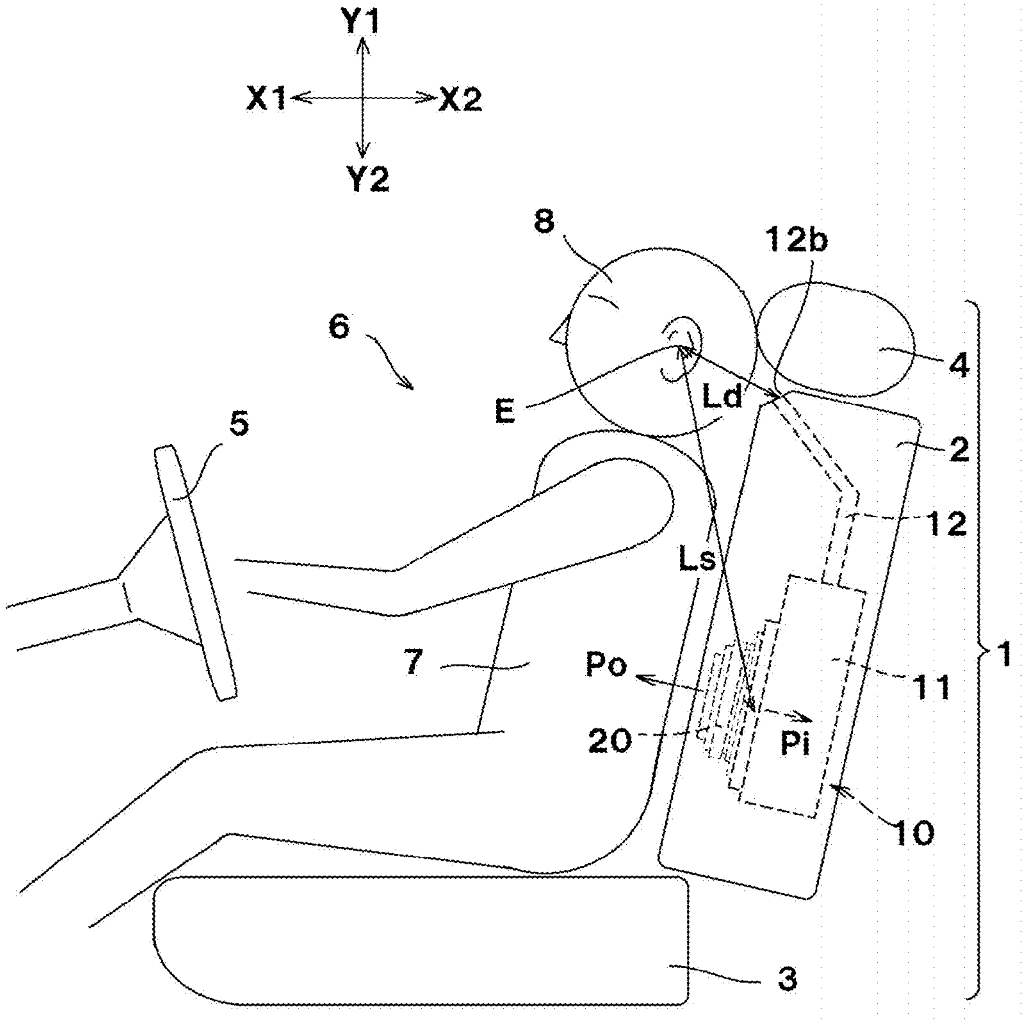
FIG. 1 is a side view of a first embodiment of the present disclosure illustrating an acoustic apparatus disposed in a seat back of a seat in a vehicle.
Figure 2:
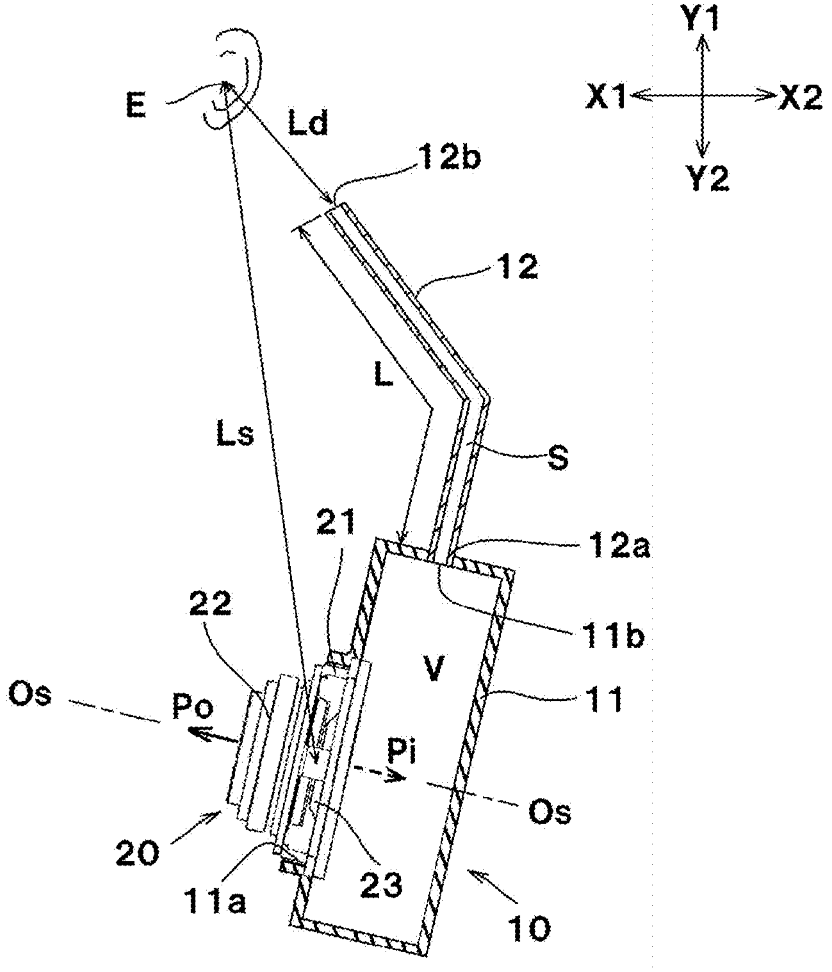
FIG. 2 is an enlarged cross section of the acoustic apparatus illustrated in FIG. 1.

FIG. 1 and FIG. 2 show the acoustic apparatus 10 of the first embodiment of the present disclosure. This acoustic apparatus 10 is mounted on a vehicle. In FIG. 1 and FIG. 2, an X1-X2 direction is longitudinal, the direction X1 is front, or a running direction of the vehicle, and the direction X2 is rear. Y1-Y2 is a vertical direction, the direction Y1 is upper, and the direction Y2 is lower.

FIG. 1 shows a seat 1, a driver's seat in a vehicle, and a steering wheel 5 in front of the seat 1 (direction X1). The seat 1 has a seat back 2, a seat cushion 3, and a headrest 4. A listener 6 sitting in the seat 1 is a driver, and has a trunk 7 and a head 8. The head 8 is in front of the headrest 4, and ears E on both sides of the head 8 are listening positions.

As shown in FIG. 2, the acoustic apparatus 10 has the enclosure 11, the duct 12, and the speaker unit 20, and composes a bass reflex speaker. The enclosure 11 has a mounting hole (baffle opening) 11a opening on a surface facing frontward (direction X1), and a connection port 11b opening on a surface facing upward (direction Y1). The enclosure 11 is a closed box without any openings except for the mounting hole 11a and the connection port 11b. The speaker unit 20 is mounted on the mounting hole 11a. As shown in FIG. 1, the enclosure 11 and the speaker unit 20 are fixed inside the seat back 2. A duct 12 has one end, which is a connection end 12a, connected to the connection port 11b of the enclosure 11, and an inner space of the duct 12 and an inner space of the enclosure 11 are connected. The other end of the duct 12 is an exit 12b. The exit 12b functions as a sound radiator which radiates sound pressure outside. As shown in FIG. 1, the exit 12b of the duct 12 is positioned in an upper part of the seat back 2, and opened to the ears E near the ears E of the listener 6.

The listening positions of the acoustic apparatus 10 are the positions of the ears E, when the head 8 of a standard type adult sitting in the seat 1 touches the headrest 4. Two ducts 12 are connected to the enclosure 11, and exits 12b of the two ducts 12 are opened near respective ears of the both ears E of the listener 6. Moreover, two sets of the acoustic apparatuses 10, which are enclosures 11 including speaker units 20 and each of them having one duct 12 connected, may be prepared, each acoustic apparatus 10 may be disposed inside the seat back 2, and the exits 12*b* of the ducts 12 of each acoustic apparatus 10 may be opened near the right and left ears E, respectively. The duct 12 is disposed inside the seat back 2 at least partially, and in order to make it easy to dispose and treat the duct 12 in the seat back 2, the duct 12 is preferably made of a flexible hose. A cross section of the duct 12 is round, oval, rectangular, etc., and its area is uniform along the entire duct length.

A center line Os of the speaker unit 20 is shown in FIG. 2. A frame 21 of the speaker unit 20 is fixed to the mounting hole 11*a* of the enclosure 11, with the center line Os slightly inclined clockwise relative to the longitudinal direction (X1-X2 direction). A magnetic circuit 22 is fixed to one surface of the frame 21 along the center line Os, and a conical diaphragm 23 is disposed at the other surface along the center line Os. A bobbin extends from the center of the diaphragm 23 to the left of the figure along the center line Os, a voice coil is wound around the bobbin, and the voice coil is positioned in a magnetic gap of the magnetic circuit 22. A hole formed in a connecting part of the diaphragm 23 and the bobbin is covered by a cap material at the right of the figure. The diaphragm 23, the bobbin, the voice coil, the cap material, etc. compose a vibrating part of the speaker unit 20. A circumferential edge of the diaphragm is supported by the frame 21 with edge material, and the bobbin is supported by the frame with damper material. The edge material and the damper material function as a part of a spring supporting system which supports the vibrating part allowing vibration along the center line Os. A part of the mass of this spring supporting system is added as the mass of the vibrating part.

In the speaker unit 20, the vibrating part including the diaphragm 23 is vibrated linearly along the center line Os in the frame 21, by an electromagnetic force excited by a voice current applied to the voice coil, and transversal magnetic flux applied from the magnetic circuit 22 to the voice coil. By a vibration of the diaphragm 23, inward sound pressure (an internal pressure wave) Pi is transmitted to the inner space of the enclosure 11, and outward sound pressure (an external pressure wave) Po is transmitted to the outer space of the enclosure 11. The inward sound pressure Pi and the outward sound pressure Po differ in phase by 180° with respect to air density period, and are thus in opposite phases. As shown in FIG. 1, the listening positions are the positions of the ears E when the listener 6 sits down and the head 8 touches the headrest 4, and a direct distance Ld from the listening position to the center of the exit 12*b* of the duct 12 is shorter than a direct distance Ls from the listening position to a center of gravity of the diaphragm 23 of the speaker unit 20. The direct distance Ls is preferably at least twice as long as the direct distance Ld, more preferably at least 3 times as long as the direct distance Ld. The direct distance Ld is approximately 100 mm to 200 mm, for example 150 mm.

Subsequently, an operation of the acoustic apparatus 10 is described. In the acoustic apparatus 10 shown in FIG. 1 and FIG. 2, the enclosure 11 and the duct 12 compose a Helmholtz resonator. Without considering an operation of the speaker unit 20, the Helmholtz resonator has a fixed resonant frequency Fd. The resonant frequency Fd is physically calculated from an internal volume (V) of the enclosure, and a length (L) and a cross section(S) of the duct, and found by a formula: $Fd=(C/2\cdot\pi)\sqrt{(S/V\cdot L)}$ (C refers to the speed of sound). The resonant frequency Fd is inversely proportional to the internal volume (V) of the enclosure and the length of the duct (L), and is proportional to the cross section(S) of the duct.

When the speaker unit 20 operates, the inward sound pressure Pi generated by the operation of the diaphragm 23 becomes the entering pressure wave to the Helmholtz resonator. When the frequency of the entering pressure wave coincides with or nears the resonant frequency Fd, the air in the duct 12 resonates and the sound pressure radiated from the exit 12*b* of the duct 12 becomes higher. In this case, the vibration of the inward sound pressure Pi transmitted by the diaphragm 23 and the vibration of the air in the duct 12 are in opposite phases with each other, and the sound pressure radiated outward from the exit 12*b* of the duct 12 and the outward sound pressure Po radiated from the speaker unit 20 to the outside of the enclosure 11 are in phase. When the frequency of the inward sound pressure Pi is higher than the resonant frequency Fd, the higher the frequency of the inward sound pressure is, the lower the sound pressure radiated from the exit 12*b* of the duct 12 is. This is because when the frequency of the inward sound pressure Pi is higher than the resonant frequency Fd, even if the air in the enclosure 11 expands or contracts, the air in the duct 12 becomes less responsive, the air in the duct 12 becomes less mobile.

When the frequency of the inward sound pressure Pi entering the enclosure 11 is lower than the resonant frequency Fd of the Helmholtz resonator, a spring function of the air in the enclosure 11 falls, the variation of the air pressure in the enclosure 11 is transmitted to the inside of the duct 12 directly, and the air in the duct 12 vibrates with the same phase as the diaphragm 23 of the speaker unit 20. When the sound pressure radiated from the exit 12*b* of the duct 12 vibrates with the same phase as the inward sound pressure Pi, the outward sound pressure Po radiated outside the enclosure 11 from the speaker unit 20 and the sound pressure radiated from the exit 12*b* of the duct 12 have opposite phases. As the listening position is far from both the exit 12*b* of the duct 12 and the speaker unit 20, a conventional bass reflex speaker system has a problem in which the lower an operating frequency of the diaphragm 23 of the speaker unit 20 becomes, the weaker an audible sound pressure becomes, because the sound pressure from the exit 12*b* and the outward sound pressure Po, which are in opposite phases, interfere canceling each other.

However, as shown in FIG. 1, when the listening position is situated at a position where the direct distance Ld from an exit 12*b* of the duct 12 is shorter than the direct distance Ls from the speaker unit 20, even if the speaker unit 20 operates at a lower frequency than the resonant frequency Fd, the listener 6 can listen to the sound pressure from the exit 12*b* directly without being appreciably affected by the interference of the outward sound pressure Po radiated from the speaker unit 20. Therefore, the acoustic apparatus 10 of the present embodiment is configured to be able to enhance the sound pressure acting on the ears E from the exit 12*b* of the duct 12, by configuring the resonant frequency F0 of the vibration mass Mms of the bass reflex speaker system to be lower than the resonant frequency Fd of the Helmholtz resonator, and enhancing amplitude of the air in the duct 12 in a frequency band where the diaphragm 23 of the speaker unit 20 and the air in the duct 12 vibrate with the same phase.

FIG. 4 to FIG. 7 show frequency characteristics of the sound pressure from the exit 12*b* of the duct 12 in the respective examples of the present disclosure. As shown in the respective figures, when the resonant frequency F0 of the vibration mass Mms of the bass reflex speaker system is configured to be a lower frequency than the resonant frequency Fd of the Helmholtz resonator, it is enabled to enhance the sound pressure that acts on the ears E from the exit 12*b* of the duct 12 in a frequency band from near the resonant frequency F0 to near the resonant frequency Fd. When the resonant frequency F0 of the vibration mass Mms is situated in a bass region lower than 100 Hz, the ears E of the listener 6 are enabled to listen to a reproduced sound enhanced in its bass region. Moreover, when the resonant frequency F0 of the vibration mass Mms is lower than 100 Hz, and the resonant frequency Fd of the Helmholtz resonator is higher than 100 Hz, the sound pressure transmitted from the exit 12*b* of the duct 12 to the ears E has a peak positioned near the resonant frequency F0 lower than 100 Hz, and another peak positioned near the resonant frequency Fd higher than 100 Hz, and the present embodiment functions as a bandpass acoustic apparatus in which a frequency band from near the resonant frequency F0 to near the resonant frequency Fd is enhanced. As shown in each embodiment, when the direct distance Ld from the exit 12*b* of the duct 12 to the ears E is 150 mm, a sound pressure difference in a frequency band from the peak near the resonant frequency F0 to the peak near the resonant frequency Fd is 10 dB or less, and a characteristic whereby when the frequency is lower than the peak near the resonant frequency F0, the lower the frequency is, the lower the sound pressure is, and when the frequency is higher than the peak near the resonant frequency Fd, the higher the frequency is, the lower the sound pressure is, is obtained.

Although the sound pressure that acts on the ears E from the exit 12*b* of the duct 12 is high between the peak near the resonant frequency F0 and the peak near the resonant frequency Fd, the sound pressure from the exit 12*b* and the outward sound pressure Po from the speaker unit 20 are in opposite phases. Therefore, at a location far from both the exit 12*b* and the speaker unit 20, the sound pressures in opposite phases interfere to cancel each other, and the audible sound pressure is largely reduced. Therefore, the bass range sound becomes less propagable to the position far from the seat 1 in which the listener 6 is seated. Particularly, the bass range sound pressure from the peak near the resonant frequency F0 to the peak near the resonant frequency Fd tends to propagate to surroundings, for example, when the seat 1 is in an interior of a vehicle, the bass tends to propagate outside the vehicle; however, by the sound pressures in opposite phases interfering to cancel each other as described above, sound leakage outside the vehicle body becomes preventable.

The acoustic apparatus 10 can transmit enhanced sound pressure of comparatively bass range from the exit 12*b* of the duct 12 to the ears of the listener 6, and it is also possible to generate midrange sound pressure by this acoustic apparatus 10. Moreover, it is also possible that the acoustic apparatus 10 generates mainly the bass range sound pressure, and additionally another speaker unit radiating midrange to treble sound is mounted in a seat 1 or near the listener 6.

Figure 3:
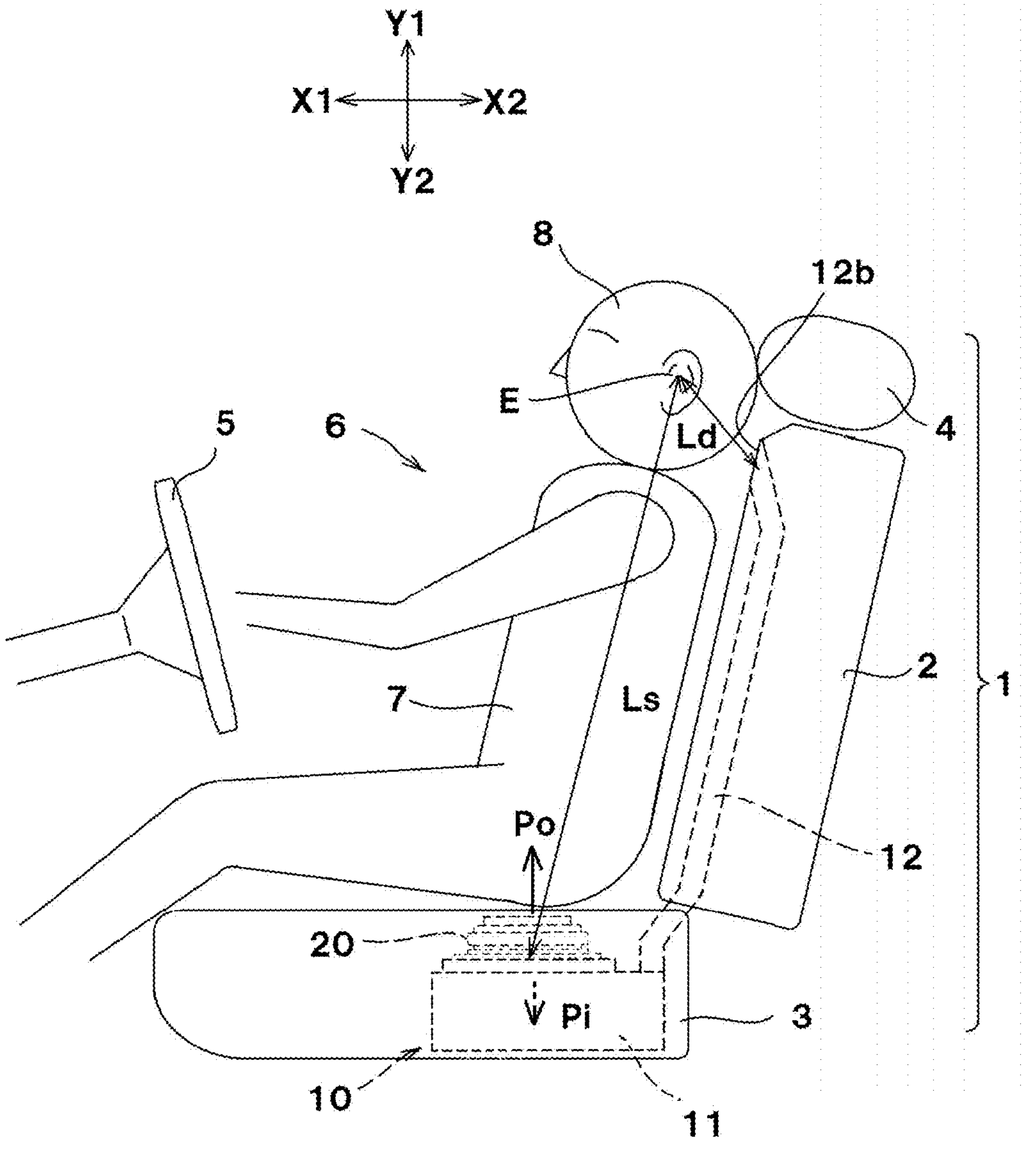
FIG. 3 is a side view of a second embodiment of the present disclosure illustrating an acoustic apparatus disposed in a seat cushion of a seat in a vehicle.

FIG. 3 shows the acoustic apparatus 110 of the second embodiment of the present disclosure. This acoustic apparatus 110 has, same as the acoustic apparatus 10 shown in FIG. 2, the Helmholtz resonator composed of the enclosure 11 and the duct 12 communicating into the inner space of the enclosure 11, and the speaker unit 20 is fixed to the enclosure 11. The enclosure 11 and the speaker unit 20 are fixed inside a seat cushion 3. The duct 12 is composed of a flexible hose, and runs through the inside of the seat cushion 3 and the inside of the seat back 2 partially. Moreover, the exit 12*b* of the duct 12 is opened at a position which is positioned at an upper part of the seat back 2 and near the ear E of the listener 6. In the acoustic apparatus 110 of the second embodiment, since the speaker unit 20 is disposed inside the seat cushion 3, the direct distance Ls from the ear E at the listening position to a center of gravity of the diaphragm 23 of the speaker unit 20 can be ensured to be long, and the direct distance Ls can be configured to be 4 times or 5 times as long as the direct distance Ld from the ears E to the center of the exit 12*b* of the duct 12. By configuring the difference between the direct distances Ls and Ld to be larger, it is enabled to listen to the sound radiated from the exit 12*b* of the duct 12, without large interferences of outward sound pressure Po of the speaker system.

In the acoustic apparatus 10 of the first embodiment shown in FIG. 1, the outward sound pressure Po from the speaker unit 20 is aimed at the trunk of the listener 6, and in the acoustic apparatus 110 of the second embodiment shown in FIG. 3, the outward sound pressure Po from the speaker unit 20 is aimed at the buttocks of the listener 6. In the acoustic apparatus 10, 110, by configuring the resonant frequency F0 of the vibration mass Mms to be less than 100 Hz, the enhanced bass is transmitted from the exit 12*b* of the duct 12 to the ears E; the outward sound pressure Po with the period same as the bass is transmitted to the body of the listener 6 as a vibration, and the listener 6 is enabled to feel bass with the entire body.

EXAMPLES

Figure 6:
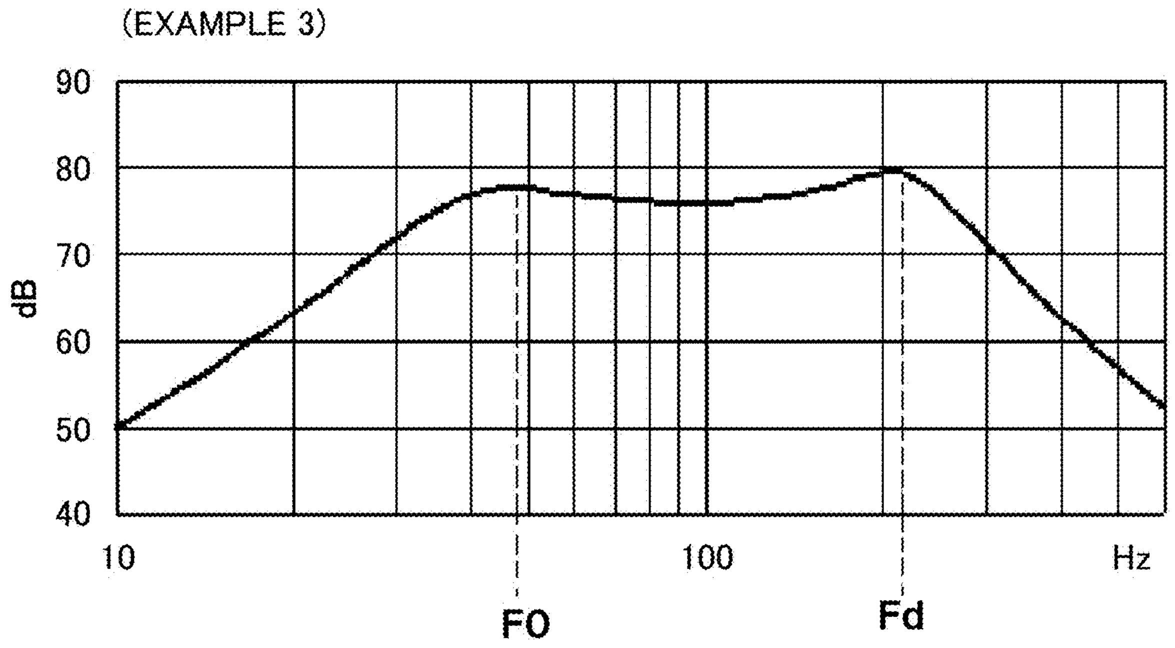
FIG. 6 is a diagram illustrating a frequency characteristic of sound pressure listened to near an exit of a duct in an example 3 of the acoustic device of the present disclosure.
Figure 7:
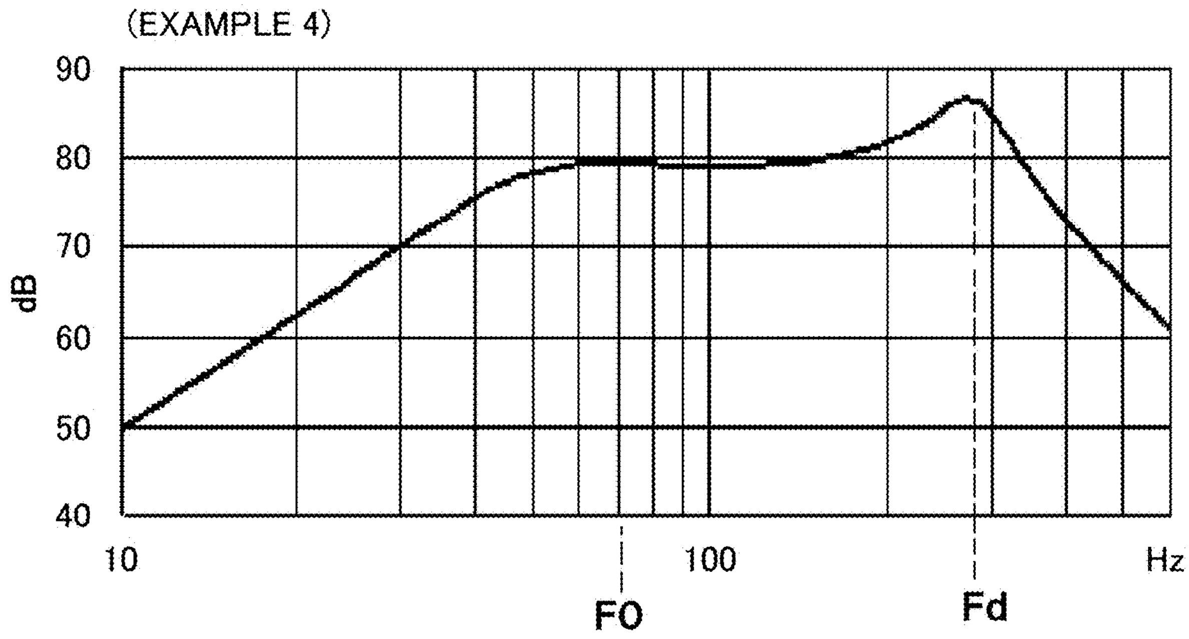
FIG. 7 is a diagram illustrating a frequency characteristic of sound pressure listened to near an exit of a duct in an example 4 of the acoustic device of the present disclosure.
Figure 8:
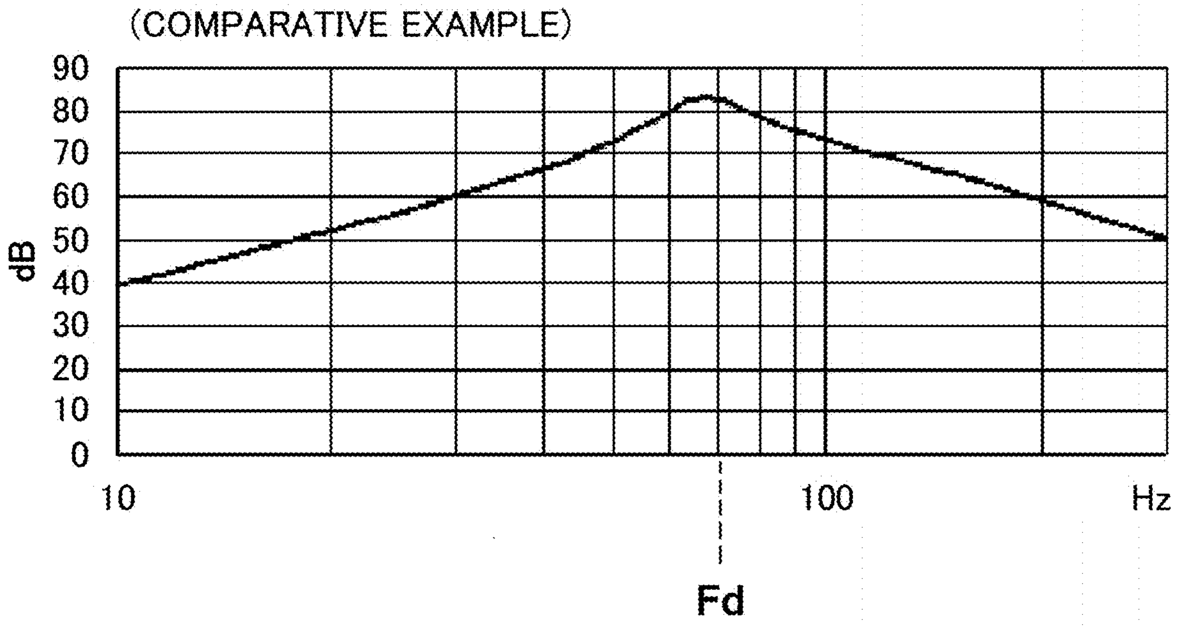
FIG. 8 is a diagram illustrating a frequency characteristic of sound pressure listened to near an exit of a duct in a comparative example.

FIG. 4 to FIG. 7 show examples of the acoustic apparatus 10, 110 of the present disclosure, and FIG. 8 shows a comparative example. The respective embodiments and the comparative example are results of simulations illustrating frequency characteristics of the sound pressure, supposing that they are measured at the position 150 mm from the exit 12*b* of the duct 12, on the condition to ignore the outward sound pressure Po from the speaker unit 20, when a 1 W sine wave is input to the voice coil of the speaker unit 20. Horizontal axes are logarithmic axes indicating frequency (Hz), and vertical axes indicate sound pressure level (dB).

Example 1

Figure 4:
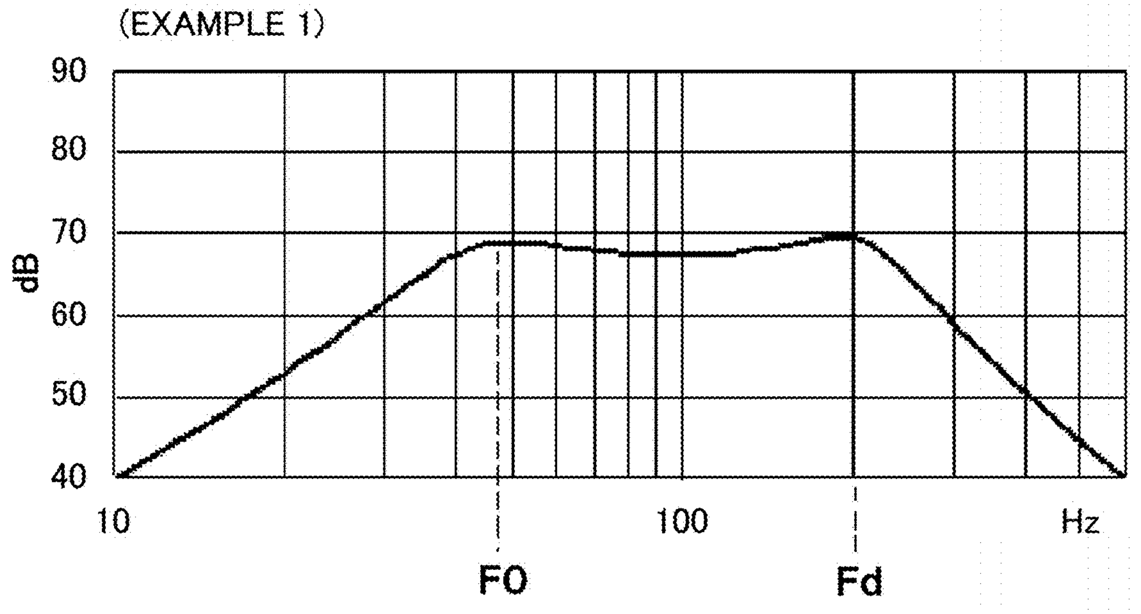
FIG. 4 is a diagram illustrating a frequency characteristic of sound pressure listened to near an exit of a duct in an example 1 of the acoustic device of the present disclosure.

FIG. 4 shows the frequency characteristics of the example 1. The parameters of the example 1 are the following:

Internal volume of the enclosure 11: 150 cc
Length of the duct 12: 50 cm
Inside diameter of the duct 12: 2 cm
Effective vibrational diameter of the diaphragm 23: 6.2 cm
Resonant frequency Fd of the Helmholtz resonator: 110 Hz
Resonant frequency F0 of the vibration mass: 48 Hz

Example 2

Figure 5:
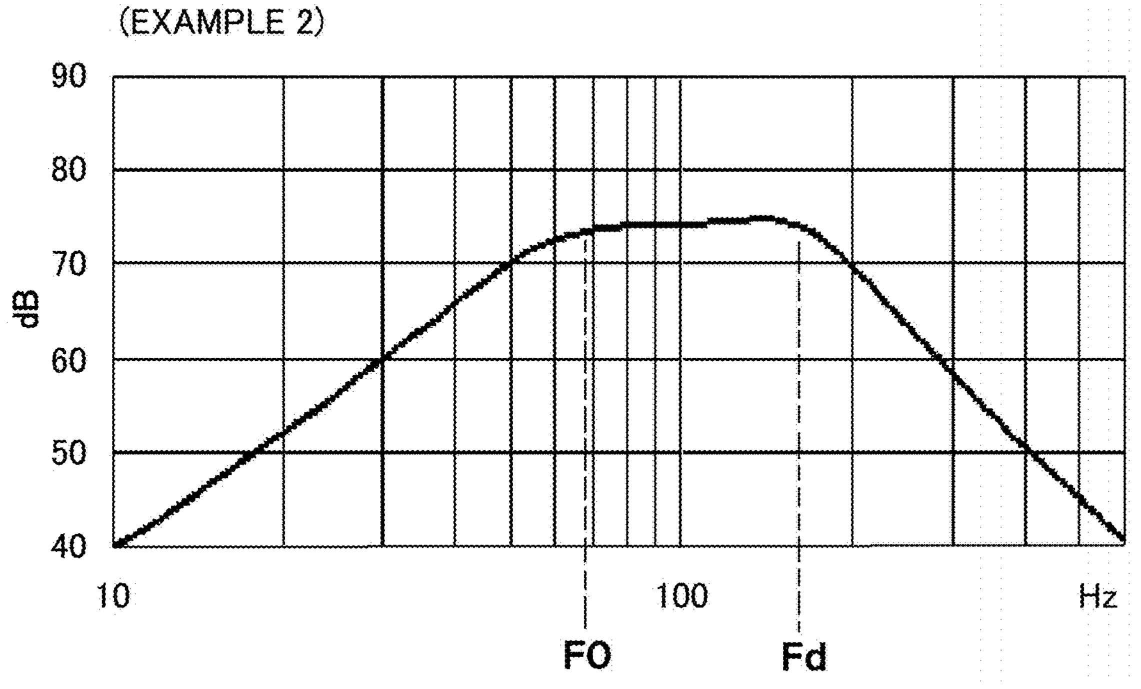
FIG. 5 is a diagram illustrating a frequency characteristic of sound pressure listened to near an exit of a duct in an example 2 of the acoustic device of the present disclosure.

FIG. 5 shows the frequency characteristic of the example 2. The parameters of the example 2 are the following:

Internal volume of the enclosure 11: 300 cc
Length of the duct 12: 50 cm
Inside diameter of the duct 12: 3 cm
Effective vibrational diameter of the diaphragm 23: 6.2 cm
Resonant frequency Fd of the Helmholtz resonator: 107 Hz Resonant frequency F0 of the vibration mass: 68 Hz Example 3

FIG. 6 shows the frequency characteristic of the example 3. The parameters of the example 3 are the following:

Internal volume of the enclosure 11: 300 cc
Length of the duct 12: 50 cm
Inside diameter of the duct 12: 3 cm
Effective vibrational diameter of the diaphragm 23: 8 cm
Resonant frequency Fd of the Helmholtz resonator: 112 Hz
Resonant frequency F0 of the vibration mass: 48 Hz Example 4

FIG. 7 shows the frequency characteristic of the example 4. The parameters of the example 4 are the following:

Internal volume of the enclosure 11: 200 cc
Length of the duct 12: 30 cm
Inside diameter of the duct 12: 3 cm
Effective vibrational diameter of the diaphragm 23: 8 cm
Resonant frequency Fd of the Helmholtz resonator: 118 Hz
Resonant frequency F0 of the vibration mass: 70 Hz Comparative Example FIG. 8 shows the frequency characteristic of the comparative example. The comparative example is a result of a simulation illustrating frequency characteristics of the sound pressure level near the exit of the duct in a general bass reflex speaker system. The resonant frequency Fd of the Helmholtz resonator is situated near 70 Hz, and the resonant frequency F0 of the vibration mass is higher than the resonant frequency Fd.

As the comparative example FIG. 8, in a conventional bass reflex speaker system, the sound pressure can be raised near the resonant frequency Fd, by configuring the resonant frequency Fd of the Helmholtz resonator to be lower than the resonant frequency F0 of the speaker system. However, the sound pressure to be raised is limited in a narrow frequency band near the resonant frequency Fd. Conversely, in the embodiment 1 to the embodiment 4, the sound pressure acting from the exit 12*b* of the duct 12 to the ears E can be raised in a wide frequency band from near the resonant frequency F0 to near the resonant frequency Fd, and bass of a wide frequency band can be listened to enhanced.

According to the embodiments shown in FIG. 4 to FIG. 7, in order to enable the resonant frequency F0 of the vibration mass of the speaker system to be less than the resonant frequency Fd of the Helmholtz resonator by increasing a load mass of the air in the duct 12, the duct length is preferably at least 8 times as long as the inside diameter of the duct 12, and more preferably at least 10 times.

The present application is based on and claims priority to Japanese patent application No. 2023-121815 filed on Jul. 26, 2023 with the Japanese Patent Office, the entire contents of which are hereby incorporated by reference.

What is claimed is:

1. An acoustic apparatus comprising:

an enclosure;

a duct communicating into an inner space of the enclosure, the duct including a first opening and a second opening, the first opening and the second opening provided above the enclosure;

a seat; and a speaker unit configured to transmit sound pressures in opposite phases to an inside and an outside of the enclosure, respectively, wherein the enclosure includes (i) a connection port, which communicates the first opening and the enclosure, and (ii) a mounting hole, which is mounted the speaker unit, wherein the enclosure is a closed box except for the connection port and the mounting hole, wherein the enclosure and the speaker unit are stored inside the seat, wherein a resonant frequency Fd of a Helmholtz resonator composed of the enclosure and the duct is higher than a resonant frequency F0 of a vibration mass including a mass of a vibrating part of the speaker and a load mass of air in the duct, and wherein a listening position is situated at a position at which a direct distance Ld from the second opening of the duct is shorter than a direct distance Ls from a diaphragm of the speaker unit.

2. The acoustic apparatus according to claim 1, wherein the speaker unit and the enclosure are stored in a seat back of the seat or a seat cushion of the seat, wherein one of the sound pressures in opposite phase to another one of the sound pressures that is transmitted to the enclosure is transmitted from the speaker unit to a listener seated in the seat, and the exit of the duct is opened near an ear of the listener.

3. The acoustic apparatus according to claim 2, wherein the duct is a flexible hose which is stored in the seat back at least partially.

4. The acoustic apparatus according to claim 1, wherein the resonant frequency F0 of the vibration mass is less than 100 Hz.

5. The acoustic apparatus according to claim 4, wherein a sound pressure obtained at the exit of the duct has a peak situated in a frequency band lower than 100 Hz, and another peak situated in a frequency band higher than 100 Hz.

* * * * *